United States Patent [19]

Mancini et al.

[11] 4,096,383
[45] Jun. 20, 1978

[54] PULSE-GENERATING APPARATUS RESPONSIVE TO SHAFT ROTATION

[75] Inventors: Ronald Alfred Mancini, Ridgeway, Va.; Douglas Kile Thomson, Greensboro, N.C.

[73] Assignee: Gilbert & Barker Manufacturing Company, Greensboro, N.C.

[21] Appl. No.: 739,792

[22] Filed: Nov. 8, 1976

[51] Int. Cl.² .............................................. G01D 5/34
[52] U.S. Cl. .............................. 250/231 SE; 250/227
[58] Field of Search ..... 250/231 R, 231 SE, 231 GY, 250/237 R, 237 G, 227; 356/169, 170; 340/347 P

[56] References Cited

U.S. PATENT DOCUMENTS

| 3,283,409 | 11/1966 | Rothe et al. | 250/231 GY |
| 3,539,777 | 11/1970 | Rohland | 250/227 |
| 3,622,793 | 11/1971 | Dalton et al. | 250/227 |
| 3,814,934 | 6/1974 | Mesh et al. | 250/231 SE |
| 3,999,074 | 12/1976 | Callaghan | 250/227 |

Primary Examiner—David C. Nelms
Attorney, Agent, or Firm—Finnegan, Henderson, Farabow & Garrett

[57] ABSTRACT

Apparatus for converting the revolutions of a shaft into pulses including a disc having devices such as slots or reflectors radially spaced around its periphery and light-transmitting and light-receiving fiber optic cables aligned for sensing the devices as the disc rotates. A light source, such as a light-emitting diode, is positioned at the outer end of a light-transmitting cable for providing light, and at least one phototransistor at the outer end of a light-receiving cable converts the light signals into electric pulses. Preferably, the light-transmitting and light-receiving cables are paired, giving successive signals as a slot or reflector is sensed for activating a counting circuit. A single light-transmitting cable is preferably split near the disc to provide two light sources from a single light-emitting diode. The apparatus has special utility in the atmosphere of a gasoline pump, or other metering device, requiring intrinsic safety in that the fiber optic cables convey light signals developed within the potentially explosive area to electric circuitry safely barriered from exposure to explosive gases.

14 Claims, 6 Drawing Figures

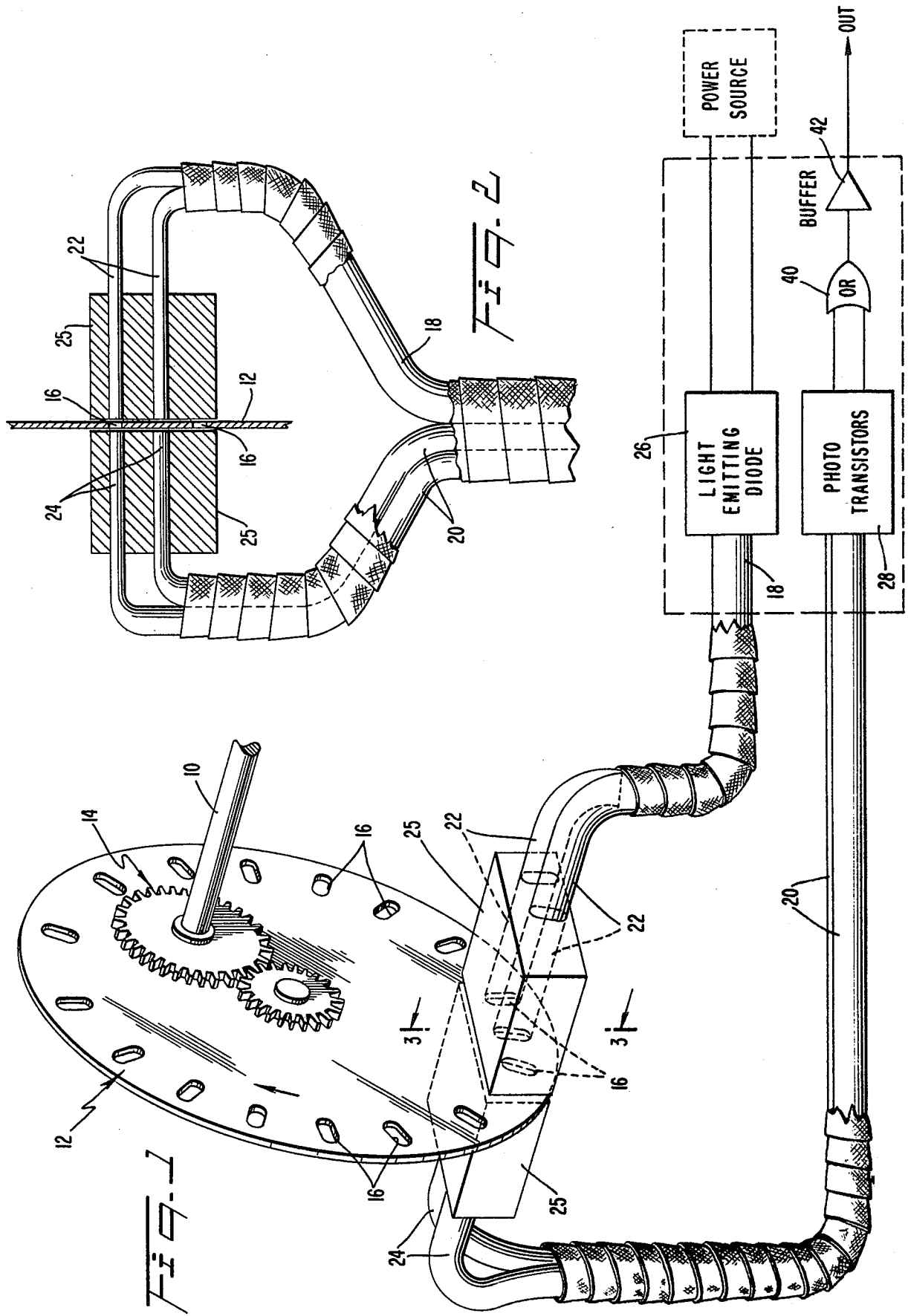

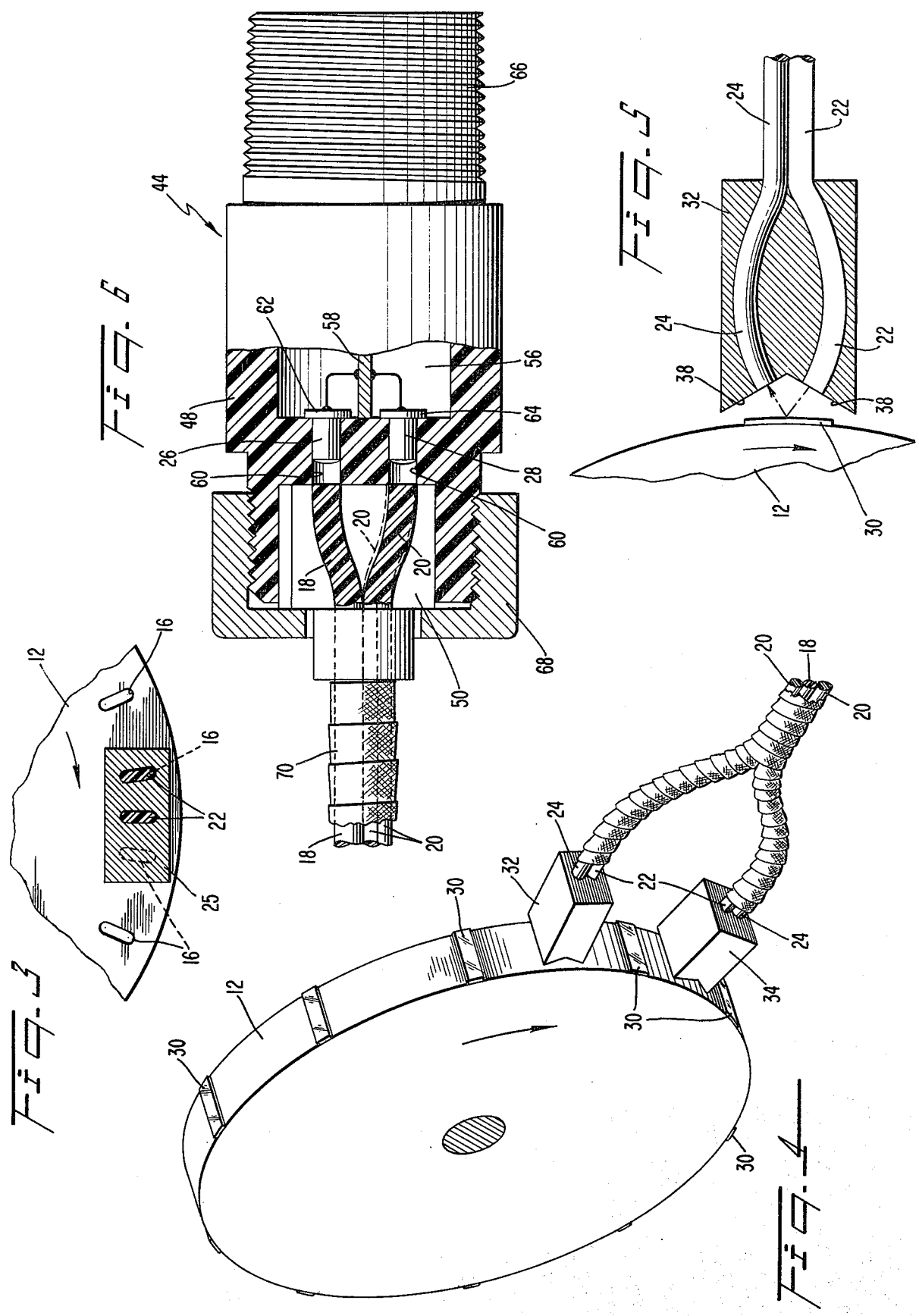

PULSE-GENERATING APPARATUS RESPONSIVE TO SHAFT ROTATION

BACKGROUND OF THE INVENTION

The present invention relates to improved apparatus for generating a preset number of pulses for each revolution of a shaft, or similar device, and, more particularly, to apparatus for sensing spaced devices around the periphery of a revolving disc by the use of light beams.

The conversion of the revolutions of a shaft into analagous electric pulses is well known. Specific apparatus for such conversion is taught in U.S. Pat. No. 3,814,934 to Mesh et al, with common assignee with the present invention. In the Mesh et al patent, a pair of light sources is aligned with a pair of photocells on opposite sides of a disc mounted on the shaft. Slots radially arranged around the periphery of the disc sequentially set and reset a flip-flop as each slot allows the light from the sources to activate the photocells.

In the apparatus of the Mesh et al patent, the light sources and the photocells are positioned adjacent the revolving disc. When the revolving shaft and disc are utilized, for example, in the metering of gasoline dispensed from a pump, the disclosed apparatus entailed the positioning of electrical devices, such as light bulbs, or other sources of radiant energy and photocells within the housing of the gasoline pump.

Due to the stringent requirements for intrinsic safety controlling gasoline pumps, it was cumbersome and costly to provide barriers, screening the electrical devices from potentially explosive gaseous combinations of gasoline and air.

SUMMARY OF THE PRESENT INVENTION

It is therefore the primary object of this invention to improve apparatus for sensing devices spaced around the periphery of a revolving metering disc while removing electrical energy devices from the immediate vicinity of the disc.

In accordance with the purposes of the invention as embodied and broadly described herein, the improvement in apparatus utilizing a light path for sensing the revolutions of a shaft comprises a disc coupled to the shaft for revolving therewith, means radially spaced around the periphery of the disc for completing and interrupting the light path at discrete intervals proportional to the revolution of the shaft, fiber optic cable means for providing the light path, energy means for providing light at one end of the light path and means positioned at the other end of the light path for sensing the completions of the light path.

Preferably, the radially spaced means around the periphery of the disc comprises a circular set of apertures coaxial with the disc, and the cable means includes a light-transmitting cable and a light-receiving cable having ends on opposite sides of the disc and aligned with the apertures for providing the light path therethrough.

In a preferred embodiment, the apertures are shaped as slots having their longitudinal axes on the radii of the disc and the aligned ends of the cables are contoured in the shape of slots, the longitudinal axes of the contoured ends of the cables being aligned with the radii of the disc.

In an alternative embodiment the radially spaced means around the periphery of the disc comprises reflectors and the light-transmitting cable and light-receiving cable are positioned side-by-side in alignment with the rotating spaced reflectors.

Also in the preferred embodiment, the energy means for providing the light at one end of the light path includes a light-emitting diode and the sensing means includes a phototransistor.

It is further preferred that the light-transmitting cable and the light-receiving cable be utilized in pairs, associated members of the pairs providing a light path, with the ends of the cables of the pairs aligned with the slots or reflectors being spaced apart less than the radial spacing of the slots. In this embodiment, the sensing means comprises a sensing circuit including individual phototransistors cooperating with each light-receiving cable and an OR circuit activated by the successive completions of the light paths, the first completion giving an ON signal and the second completion giving an OFF signal.

Although two light-transmitting cables may be used with individual light sources, preferably a single light-transmitting cable receives light from a single light-emitting diode. The single light-transmitting cable is then split in the vicinity of the disc to provide two individual light sources for the light-path completing devices in the disc.

In the environment of a gasoline pump wherein the revolving shaft, for example, meters the amount of gasoline being dispensed, the light-emitting diode and the sensing circuit, including the phototransistors and an OR gate, are incorporated in an intrinsically safe plug. Portions of the circuit may be included in a printed circuit.

The unique features and advantages of the invention will become apparent upon reading the following description which, taken in conjunction with the drawings, discloses the preferred embodiments of the invention.

BRIEF DESCRIPTION OF THE DRAWINGS

FIG. 1 illustrates the preferred embodiment of the invention in a partial perspective and electronic system presentation;

FIG. 2 is a diagrammatic representation of fiber optic cables providing light paths in the embodiment of FIG. 1;

FIG. 3 is a partial cross-sectional view of the embodiment of FIG. 1 taken along line 3—3 thereof;

FIG. 4 is a diagrammatic representation of a portion of an alternative embodiment of the invention;

FIG. 5 is an enlarged representation of the inner ends of a pair of fiber optic cables utilizable in the embodiment of FIG. 5; and FIG. 6 is a schematic representation of an intrinsically safe plug incorporating the electrical elements of the embodiment of FIG. 1.

DESCRIPTION OF THE PREFERRED EMBODIMENT

Reference will now be made in detail to the preferred embodiment of the invention, an example of which is illustrated in the accompanying drawings.

Apparatus utilizing a light path for sensing the revolutions of a shaft is illustrated in FIG. 1.

A shaft 10 may, for example, meter by its revolutions the amount of gasoline being dispensed by a gasoline pump (not shown). A disc 12 is coupled to the shaft 10 by a gear train, numbered generally as 14, for revolving therewith.

Means are radially spaced around the periphery of the disc 12 for completing and interrupting the light path at discrete intervals proportional to the revolution of the shaft 10. As embodied herein, the radially spaced means preferably comprises a set of apertures, shaped as slots 16, lying in a circle in the disc 12 coaxial with the disc. The longitudinal axes of the slots 16 lie on the radii of the disc 12 and the slots are so shaped as to complete and interrupt the light path at discrete intervals proportional to the revolution of the shaft 10.

In accordance with the invention, fiber optic cable means provide the light path or paths completed by the revolving slots 16. As embodied herein, at least one light-transmitting fiber optic cable 18 and at least one light-receiving fiber optic cable 20 have their ends 22, 24 (FIG. 2) on opposite sides of the disc 12 and aligned with the slots 16 for providing the light paths therethrough. As shown schematically in FIG. 2, an end 22 of the light-transmitting cable 18 directs light to the disc 12 for reception by an end 24 of the light-receiving cable 20 each time that a slot 16 completes a light path.

The aligned ends 22, 24 of the light-transmitting cable 18 and light-receiving cables 20 may be retained in position by any convenient means, such as blocks 25. The blocks 25, or other convenient positioning means, should not be light-transmissive and should be mounted immobilely with respect to the disc 12.

As embodied herein, light is provided at one end of the light path by energy means, such as a light-emitting diode 26 shown schematically on FIGS. 1 and 6, and the completed light path is sensed at the other end of the light path by means such as phototransistors 28.

In accordance with the invention, preferably a single light-transmitting fiber optic cable and a pair of light-receiving fiber optic cables are utilized. As embodied herein, the single light-transmitting cable 18 is split into two ends 22 near the disc 12 for providing a pair of light paths directed toward the slots 16. The aligned ends 22, 24 of the cables 18, 20 are respectively spaced apart by a distance less than the radical spacing of the slots 16. As shown on FIG. 1, the end 22 of the light-transmitting cable 18 on the right side is substantially aligned with a slot 16, while the end 22 of the light-transmitting cable on the left side lies between two slots.

Thus, as the disc 12 turns in a clockwise direction, as shown on FIG. 1, a slot 16 will complete light paths successively between aligned ends of the pairs of the light-transmitting and light-receiving cables.

Preferably, the aligned ends of the light-transmitting and light-receiving cables 18, 20 are contoured in the shape of the slots and have their longitudinal axes in alignment with the radii of the disc 12. As embodied herein, and illustrated in FIG. 3, the ends 22 of the light-transmitting cable 18 are contoured identically in the shape of the slots 16. The contoured ends 22 are slightly canted with respect to each other so as to be in alignment with radii of the disc 12 and coincident with the slots 16.

The ends 24 of the light-receiving cables 20 aligned, respectively, with the ends 22 of the light-transmitting cable 18 are likewise so contoured and positioned. The interrelationship of the contoured and positioned ends of the fiber optic cables with the slots 16, therefore, yields the optimum optical resolution.

In an alternative embodiment, the means radially spaced around the periphery of the disc for completing and interrupting the light path at discrete intervals proportional to the revolution of the shaft may be reflectors spaced along the periphery of the disc.

As embodied herein, the reflectors 30 are preferably affixed to the rim of the disc and the ends of the light-transmitting cable 18 and light-receiving cables 20 are aligned substantially in the plane of the disc 12.

In the embodiment of FIG. 4, an end 22 of the light-transmitting cable is paired with an end 24 of one of the light-receiving cables, the light from the light-transmitting cable being reflected into the end of the light-receiving cable by a reflector 30 as the disc 12 rotates. To this result, each pair of ends 22, 24 is retained in an undivided block 32, 34 having a contoured surface proximate the edge of the disc 12.

As embodied herein, the contoured faces of the blocks 32, 34 are formed in two planes 36, 38 interacting at an obtuse angle, the line of intersection of the planes being perpendicular to the plane of the disc 12. An end 22 of the light-transmitting cable is embedded in the plane 36 and the end 24 of one of the light-receiving cables is embedded in the plane 38 for angularly mounting the cable ends for precise reflection of light from the end of the light-transmitting cable into the end of the light-receiving cable.

In the arrangement as shown in FIG. 4, a reflector 30, as the disc 12 rotates in a clockwise direction, first passes the block 32 and then the block 34. In each case, a light path will be completed as the light from the cable end 22 is reflected into the end 24 of the light-receiving cable.

In a convenient arrangement of the fiber optic cables, the single light-transmitting cable 18 is positioned between the pair of light-receiving cables 20. When the light-transmitting cable 18 is split near the disc 12, the paired portions of the ends 22 of the light-transmitting cable 18 and the ends 24 of the light-receiving cables 20 form a "Y". The light-transmitting ends 22 are therefore positioned on the inner portions of the legs of the "Y".

As embodied herein, the light path in each leg of the Y-formation will issue from the plane 36 and reflect in the reflector 30 outwardly into the plane 38 for transmittal through a cable 20 to one of the phototransistors 28.

The blocks 32, 34 containing the paired ends of the light-transmitting and light-receiving cables are spaced apart along the periphery of the disc 12 at a distance less than the spacing between the reflectors 30. As such, the completion of the light path through block 32 may be used as an ON signal and the completion of the light path through the block 34 may be used as an OFF signal.

A light-emitting diode 26 and a pair of phototransistors 28 (only one being shown) are respectively associated with the cooperating light-transmitting fiber optic cable 18 and light-receiving fiber optic cables 20. Other light energy sources, such as light bulbs, may, of course, be used. Light-emitting diodes are preferred, however, since they are reliable, require little space and power and operate with very simple electrical circuitry. The light-emitting diode has particular utility where the metering disc is in an enclosed and substantially dark environment, such as the housing of a gasoline pump and a relatively small amount of light is required.

Likewise, light-sensitive devices other than phototransistors may be used to sense the completion of the light paths in the apparatus of the invention. However, the solid state phototransistors are completely reliable and long-lived and are preferred.

The signals emitted by the light-sensitive devices 28 can be used, for example, to actuate an OR gate 40, the output of which may be passed through a buffer 42 to a counter or other circuitry (not shown) as desired.

The operation of the disc 12 and the related circuitry in a pulse-generating apparatus is more fully set forth in the Mesh et al patent and need not be elaborated further herein.

In this connection, the disc 12 may be fabricated of plastic or other suitable material which is not light-transmissive and is sufficiently rigid to maintain its shape and retain the radially spaced slots or reflectors precisely positioned.

The intrinsic safety requirements of the Underwriters' Laboratories, Inc., are very stringent as to electrical circuitry utilized in the potentially explosive atmosphere of a gasoline pump. In the apparatus of the invention, electrical circuitry for generating pulses responsive to the revolutions of the gasoline metering shaft is completely removed or barriered from the gaseous atmosphere internal of the gasoline pump housing.

In the preferred embodiment, as shown in FIG. 6, the ends of the fiber optic cables, the light-emitting diode, the phototransistors and the attendant circuitry are incorporated in an intrinsically safe plug, numbered generally as 44, forming an explosion-proof barrier between the electric elements and the gaseous atmosphere.

As embodied herein, the plug 44 includes an intrinsically safe housing 48 having an inner cavity 50 in one end for receiving the ends of the light paths, and an outer cavity 56 for receiving the light-emitting diodes 26, the phototransistors 28 and the attendant circuitry mounted on a printed circuit board 58.

The housing 48 may be fabricated of any appropriate insulating material such as rubber or plastic, and can be inexpensively injection molded, or pressure molded of thermosetting plastic.

The inner cavity 50 and the outer cavity 56 are interconnected by three passages 60 (only two being shown in the schematic cross-section).

As embodied herein, the light-emitting diode 26 is incorporated in a plug 62 and inserted through the outer cavity 56 into the end of one of the passages 60. The passage 60 and the plug 62 are so sized in cross-section that the plugs fill the passageway and the light of the diode is restricted and directed toward the inner cavity 50.

Similarly, the phototransistors 28 are incorporated in plugs 64 and inserted through the outer cavity 56 into a pair of passages 60. The plugs 64 are also sized to fill the ends of the pair of passages 60 and any light coming into the pair of passages from the inner cavity 50 is directed by the passages 60 into the related phototransistor 28.

In the preferred embodiment, the light-emitting diode 26 and the phototransistors 28, with the printed circuit board 58 are permanently embedded in the housing 48 which may be provided with a threaded end 66. When used in the environment of a gasoline pump, for example, the threaded end 66 may be fitted into an intrinsically safe junction box.

As embodied herein, the outer ends of the fiber optic cables representing the ends of the light paths are retained in a cable plug 68. The outer end of the light-transmitting cable 18 is positioned in the cable plug 68 for alignment with the diode 26. Likewise, the outer ends of the light-receiving cables 20 are spaced in the cable plug 66 for alignment with the pair of passageways 60 containing the phototransistors. The cables 18, 20 are preferably wrapped in a sheath 70 the outer end of which is embedded in the cable plug 68.

Preferably, the cable plug 68 is threaded on the housing 48 and forms with the housing 48 an intrinsically safe plug conforming to all the requirements of the Underwriters' Laboratories as to gaseous atmosphere in hazardous locations.

The fiber glass cables of the invention are continuous from the disc 12 to the ends of the light paths passing through the explosion barrier of the plug 44 and avoiding the use of at least two interfaces. The pulse-generating apparatus of the invention thus uses a minimum number of glass-to-air interfaces, each of which would lose about 20 db of light signal, and constitutes a very sensitive system.

In accordance with the invention, the intrinsically safe plug 44 may be utilized as convenient, the end of the plug containing the inner cavity 50 being utilized in the potentially explosive atmosphere inside the gasoline pump housing and the outer cavity 56 being located outside the housing. Alternatively, as stated, the end of the plug 46 containing the outer cavity 56 may be located in an intrinsically safe junction box (not shown) associated with other electric circuitry for the pump.

It is apparent that the pulse-generating apparatus of the invention has particular utility in the conversion of gasoline-pumping apparatus from mechanical to electronic computing capacity while maintaining the required intrinsic safety standards, since no electric power is required in the vicinity of the disc to create the pulsing.

Additionally, fiber optic techniques improve the pulse-generating apparatus of the prior art, while reducing its cost.

It will now become apparent to those skilled in the art that various modifications and variations can be made in the inventive system described herein without departing from the scope or spirit of the invention.

What is claimed is:

1. In apparatus utilizing a pair of light paths for sensing the revolutions of a shaft, the improvement comprising:
    (a) a disc coupled to the shaft for revolving therewith;
    (b) means radially spaced around the periphery of said disc for completing and interrupting the light paths at discrete intervals proportional to the revolutions of the shaft;
    (c) a light-transmitting fiber optic cable having a portion split into a pair of ends, and a pair of light-receiving fiber optic cables, said split pair of light-transmitting ends and said pair of light-receiving ends being shaped and precisely aligned with said radially spaced means for completing the whole light paths by means of said radially spaced means, the aligned ends of said cables being spaced apart less than the radial spacing of said radially spaced means;
    (d) energy means for providing light at one end of the light paths; and
    (e) means positioned at the other end of the light paths for sensing the completions of the light paths.

2. The improvement of claim 1, wherein said radially spaced means comprises a circular set of slot-shaped apertures in, and coaxial with, said disc, said apertures having longitudinal axes on the radii of said disc, and wherein said aligned ends of said light-transmitting fiber optic cable are precisely aligned with said apertures on one side of said disc, and said aligned ends of said pair of light-receiving cables are on the other side of said disc precisely aligned with said apertures and said ends of said light-transmitting cable, said aligned pairs of ends being contoured identically in the shape of said apertures, having their longitudinal axes in alignment with the radii of said disc and being positioned coincident with said apertures as the apertures complete the light paths, the aligned ones of said pairs forming a successive pair of light paths through said apertures.

3. The improvement of claim 2 wherein said energy means includes a light-emitting diode and said sensing means includes a phototransistor.

4. The improvement of claim 1 wherein said radially spaced means comprises a plurality of reflectors affixed to the curved surface of the rim of said disc and wherein said pair of ends of said light-transmitting cable adjacent said disc are each respectively paired and aligned with the ends of said pair of light-receiving cables adjacent said disc to form a pair of light paths completed by reflection of light from said light-transmitting cable ends to said light receiving cable ends by said reflectors.

5. The improvement of claim 4, wherein the angularly aligned ends are potted.

6. The improvement of claim 4 wherein said paired ends of said light-transmitting and light-receiving cables are angularly mounted for precise reflection of light from the end of the light-transmitting cable into the end of the light-receiving cable by said reflectors.

7. In apparatus utilizing a pair of light paths for sensing the revolutions of a shaft for metering gasoline dispensed from a pump and for generating pulses in response thereto, the improvement comprising:
(a) a disc coupled to the shaft for revolving therewith;
(b) a set of slots in said disc, said slots being spaced adjacent the periphery of said disc and having their longitudinal axes on the radii thereof for completing and interrupting the light paths at discrete intervals proportional to the revolution of the shaft;
(c) a light-transmitting fiber optic cable having a portion split into a pair of ends, and a pair of light-receiving fiber optic cables, said pair of ends being respectively aligned with the ends of said pair of light-receiving cables on opposite sides of said disc and aligned with said slots providing a pair of light paths therethrough during the revolution of said disc, the aligned ends of said cables being spaced apart less than said radially spaced slots;
(d) light-emitting diode means cooperating with said light-transmitting cable for providing light at one end of said light paths;
(e) a pair of phototransistor means cooperating with said pair of light-receiving cables and positioned at the other end of said light paths for activation by the completion of said light paths; and
(f) a circuit for processing the output of said phototransistors.

8. The improvement of claim 7 wherein said aligned ends of said light-transmitting and light-receiving cables are contoured in the shape of said slots and wherein said contoured ends have their longitudinal axes in alignment with the radii of said disc.

9. The improvement of claim 7 also including an intrinsically safe plug incorporating said light-emitting diode, said phototransistors and said ends of said pairs of cables forming the ends of said light paths.

10. The improvement of claim 9 wherein said intrinsically safe plug also incorporates said circuit.

11. The improvement of claim 9 wherein said intrinsically safe plug includes a housing and a pair of cavities in the housing interconnected by passageways, said light-emitting diode and said phototransistors being inserted into said passageways through one of said cavities and the ends of said cables cooperating with said diode and said transistors being inserted into the other of said cavities.

12. The improvement of claim 10 wherein said circuit is incorporated in said one cavity.

13. The improvement of claim 12 wherein said intrinsically safe plug also includes a cable plug incorporating said ends of said cables cooperating with said diode and said transistors, and wherein said cable plug and said housing are removably interconnected.

14. The improvement of claim 13 wherein said diode, said phototransistors and said circuit are permanently embedded in said housing.

* * * * *